US005492146A

United States Patent [19]
George et al.

[11] Patent Number: 5,492,146
[45] Date of Patent: Feb. 20, 1996

[54] PRESSURE REGULATORS

[75] Inventors: John A. George; Paul R. Ostand; Timothy M. Garrison, all of Cincinnati, Ohio

[73] Assignee: Richards Industries, Inc., Cincinnati, Ohio

[21] Appl. No.: 197,317

[22] Filed: Feb. 16, 1994

Related U.S. Application Data

[63] Continuation of Ser. No. 939,444, Sep. 2, 1992, abandoned.
[51] Int. Cl.⁶ .................................................. G05D 16/08
[52] U.S. Cl. ...................................... 137/505.41; 137/510
[58] Field of Search ......................... 137/505.38, 505.39, 137/505.40, 505.41, 505.42, 510

[56] References Cited

U.S. PATENT DOCUMENTS

| | | | |
|---|---|---|---|
| 1,349,443 | 8/1920 | Stokes | 137/505.39 X |
| 2,301,031 | 11/1942 | Ferguson | 137/505.42 X |
| 4,516,595 | 5/1985 | Acomb | 137/505.42 X |
| 4,621,658 | 11/1986 | Buezis et al. | 137/505.41 X |
| 5,070,901 | 12/1991 | Black | 137/505.41 X |

*Primary Examiner*—Stephen M. Hepperle
*Attorney, Agent, or Firm*—Kinney & Schenk

[57] ABSTRACT

A sanitary pressure regulator comprises a pressure sensing chamber, downstream of an orifice, has its upper portion defined by a diaphragm. A valve stem, mounted on the diaphragm, extends downwardly through the orifice and has a plug disposed on the upstream side of the orifice. A valve spring, is disposed in a spring housing and acts through a lower spring retainer to yieldingly resist movement of the valve plug to a position which would restrict fluid flow. The spring housing, compression spring and lower retainer form a unit which can be mounted on and detached from a passage housing. The valve stem is mounted on the diaphragm by a nut which is threaded onto a portion of the stem which projects above the diaphragm. Provision is made to lock the valve stem in an open position to facilitate the use of high pressure fluid in cleaning the regulator. In an alternate embodiment, the valve stem is axially fixed relative to the lower spring retainer and a disc engages the lower surface of the diaphragm. In another embodiment, the valve plug is yieldingly maintained in engagement with the outlet from the orifice to regulate. This embodiment also employs a compression spring and lower spring retainer mounted in a spring housing and further has means for permitting the compression spring to assume its free length so that a second spring, acting on the spring retainer, can dispose the valve stem in an open position and the regulator drained.

23 Claims, 7 Drawing Sheets

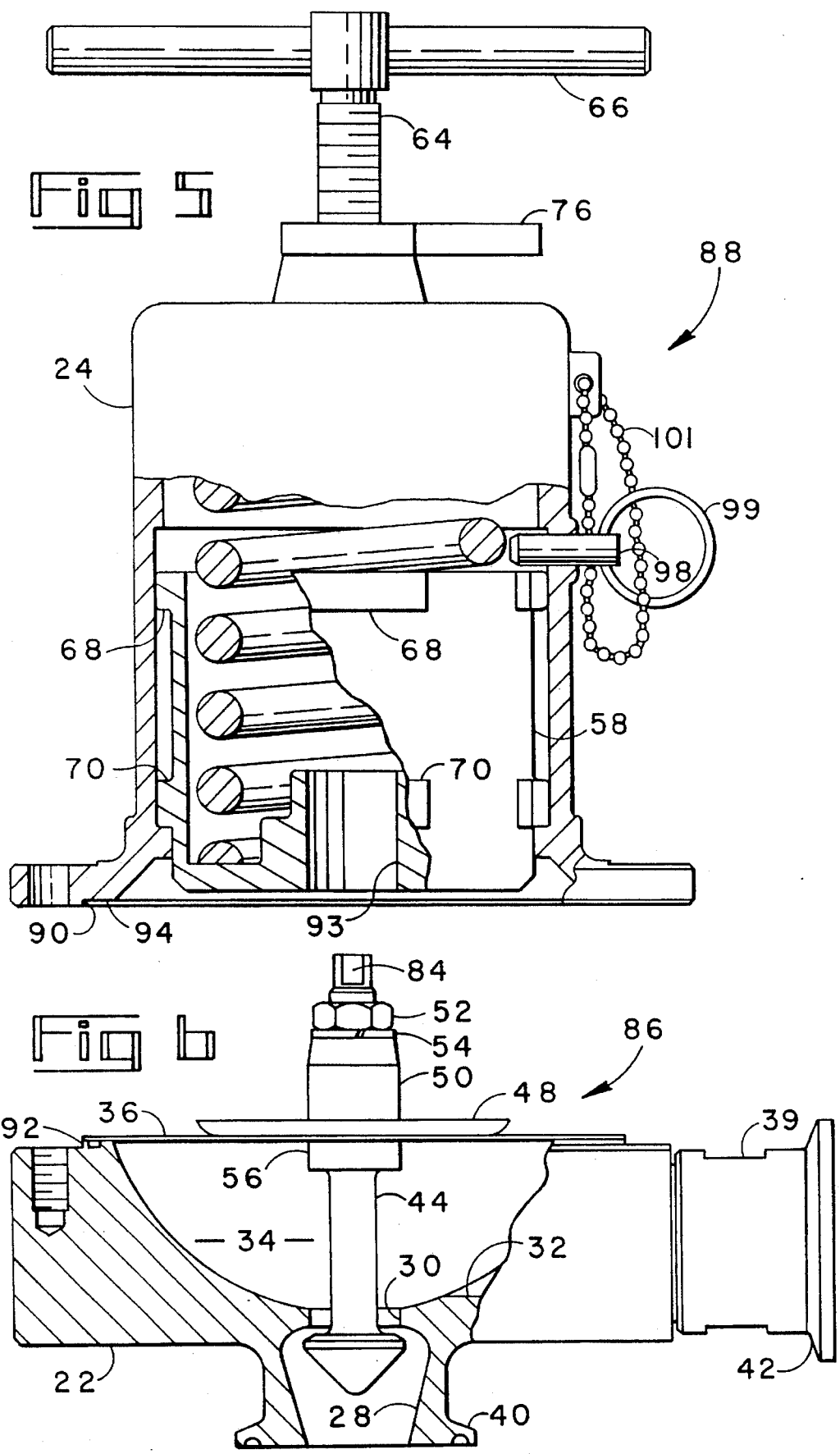

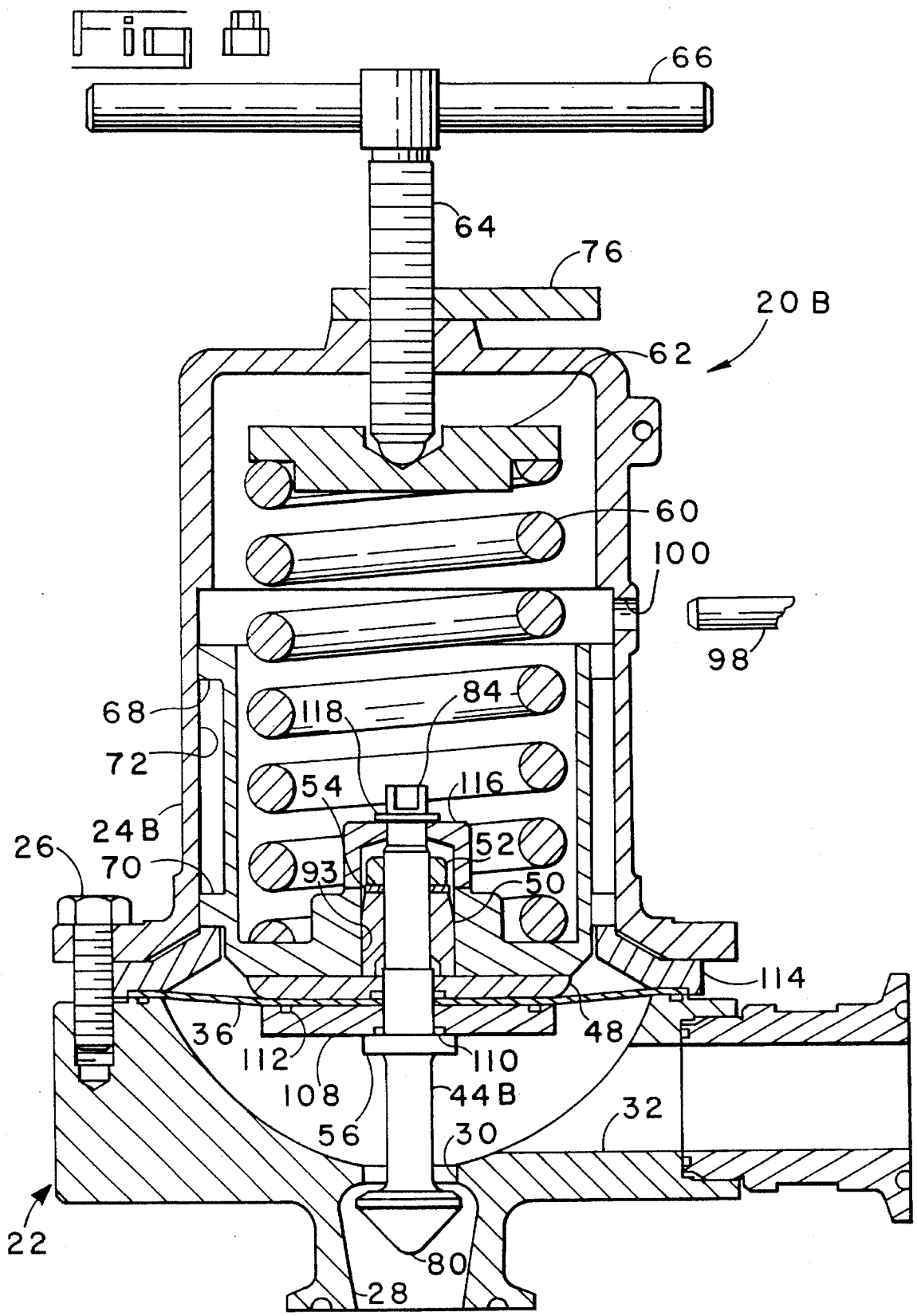

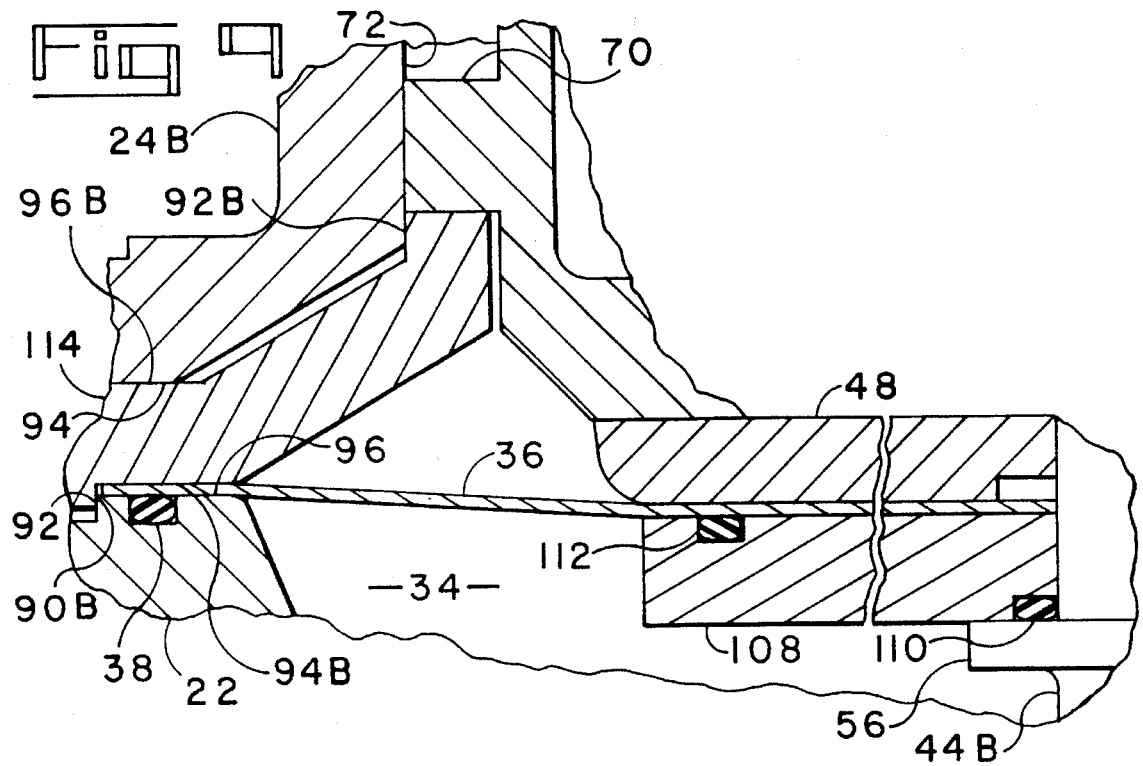
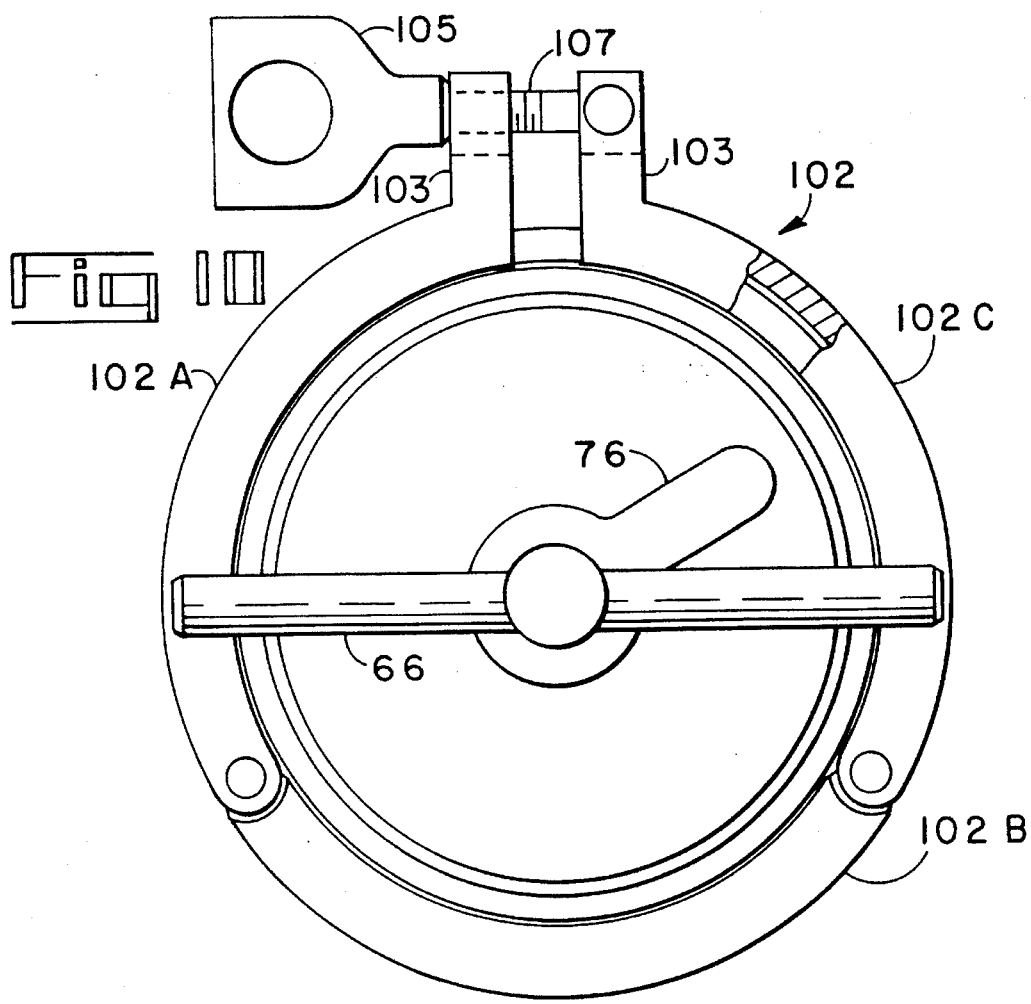

PRESSURE REGULATORS

The present application is a continuation application of application Ser. No. 939,444, filed Sep. 2, 1992, now abandoned.

The present invention relates to in pressure regulators and methods of making same, more specifically to improved pressure regulators which meet sanitary requirements in bio-tech, food and beverage, pharmaceutical, and other industries.

Pressure regulators, also known as pressure regulating valves, are a well known means for controlling pressures in fluid conduit systems. Basically, pressure regulators comprise a flow control device which has an opening that varies in flow area to control, or limit, fluid pressure either upstream or downstream of the flow control device. Regulators which control the upstream pressure are known as back pressure regulators.

Special considerations and requirements exist where pressure regulators are used in handling fluids/liquids that are potential health hazards if they are contaminated, or where regulators are employed in systems in which it is desired to change from handling one fluid to another on a relatively frequent basis. One recently introduced sanitary pressure regulator, disclosed in U.S. Pat. No. 5,070,9901 granted Dec. 10, 1991 to W. Keith Black, partially meets these special considerations and requirements.

These considerations and requirements go to facilitating the cleaning of the pressure regulator. A general consideration is the elimination of component configurations on which fluid, or particulate matter in the fluid, can collect and from which it is difficult to remove accumulated fluid and/or particulate matter. Among other things, this consideration involves elimination of threaded members/connection within the flow defining portions of the regulator, i.e., its "wetted" surfaces.

Another consideration is that components, exposed to fluid within the regulator, between which there is relative sliding movement, tend to generate particulate matter when many types of fluid, especially gases, are used. This particulate matter can be a fluid contaminant, as well as increasing the difficulty of cleaning the regulator.

Accordingly one object of the present invention is to eliminate sliding movement between the components of a sanitary pressure regulator and particularly sliding movement between the components which vary flow area in obtaining a desired pressure.

This end may be broadly attained by a sanitary pressure regulator wherein valve means, which control flow, are guided for movement relative to an orifice by means disposed outwardly from the fluid flow passage, thereby eliminating sliding contact of the valve means with the "wetted" surfaces of the regulator.

Where there is to be downstream pressure regulation, the valve means comprise a valve stem extending through the orifice and terminating in a plug disposed within the inlet passage portion, the stem and plug being spaced from the orifice and the inlet portion.

Another object of the invention is to facilitate contact cleaning of the wetted surfaces of a pressure regulator.

This end is broadly achieved in a pressure regulator in which regulation is controlled by valve means mounted for movement relative to an orifice. Controlling such movement is accomplished by mounting the valve means on a diaphragm, which defines, in part, a pressure sensing chamber. Valve movement is also a function of spring means, disposed outwardly of a flow passage, which includes the orifice, in a flow passage housing. The spring means are disposed in a spring housing, which housing and spring means are detachably mounted, as a unit, on the fluid passage housing.

It is further preferred to employ a compression spring and then to provide means for adjusting the extent to which it is compressed, in controlling pressure regulation. When this is done, the invention additionally contemplates that the adjustment means will be independent of the means for removably mounting the spring housing on the fluid passage housing, so that compression of the spring will be unaffected when the spring housing is removed from and then remounted on the fluid passage housing.

A further and related object of the invention is to obtain an accurate alignment between valve means and an orifice in a flow passage, where the flow passage is formed, at least in primary part, in a flow passage housing and the position of the valve means is controlled by spring means mounted in a spring housing.

The last named object may be broadly attained by a sanitary pressure regulator which comprises coacting positioning surfaces formed on the valve means, and the spring means and on the spring housing and the fluid passage housing establish a predetermined relation between the valve means and the orifice.

Another object of the present invention is to provide improved means for draining back pressure type regulators, which means are compatible with other objects herein.

This end may be broadly attained by a pressure regulator which comprises means for positioning valve means, relative to an orifice, in a closed position until the pressure in the flow passage inlet portion exceeds a given value. When that value is reached the valve means are positioned to maintain a substantially constant pressure in the upstream portion of the flow passage when the given value is exceeded. The positioning means include spring means for yieldingly urging the valve means to a closed position and means for adjusting the length of the spring means to obtain a desired spring force acting on the valve means. Further, the adjusting means are adjustable to permit the spring means to assume its free length. When so adjusted, yieldable means displace the spring means to a position in which the valve means is in an open position, whereby the valve means can be maintained in an open position to facilitate its being drained during a cleaning procedure.

Another object of the present invention is to minimize diaphragm stresses where there are negative pressures in the flow passages of a pressure regulator, and also to provide for draining of a regulator of the back pressure type.

These ends are advantageously attained by a regulator construction comprising housing means defining a fluid flow passage having an inlet portion, an outlet portion and orifice means intermediate the inlet and outlet portions. A diaphragm defines an upper portion of a pressure sensing chamber in one of the flow passage portions. The housing means comprises a fluid passage housing in which the inlet and outlet portions and the orifice means and the pressure sensing chamber are formed, and a spring housing. The spring housing is releasably mounted on the fluid passage housing and clamps the peripheral margin of the diaphragm therebetween.. Valve means comprise a stem disposed in axial alignment with the orifice, and projecting downwardly from the diaphragm. Spring means, disposed in the spring housing, resist upward displacement of the diaphragm. This regulator is characterized by the spring means comprising a compression spring and a lower spring retainer, and releasable means for mounting the valve stem in fixed axial relation on the lower spring retainer.

This basic construction limits downward movement of the diaphragm and stem when there is a negative pressure in the flow passage. Stresses in the diaphragm can be additionally limited by provision of an appropriately sized disc engaging the lower surface of the diaphragm to limit its flexure to the outer annular portion thereof.

In a back pressure type regulator, downward movement of the valve stem plug, under the influence of the spring acting on the lower spring retainer, is limited by engagement of the stem plug with the exit from the orifice. Thus, axially locking of the valve stem relative to the spring retainer does not have any affect on diaphragm/valve position when there is a negative pressure in the flow passage. However, by axially fixing the valve stem relative to the spring retainer, it is possible to provide means for raising the valve stem to a position spaced above the orifice and provide for draining of the valve.

Another object of the present invention is to facilitate mounting of a valve stem on a diaphragm where the valve stem cooperates with an orifice in a flow passage in providing a pressure regulating function. More specifically, the problems sought to be overcome by this object relate to the fact that the valve stem extends downwardly through an orifice and has a plug disposed therebeneath, requiring the valve stem to be inserted upwardly through the orifice in initially assembling the regulator.

Further pursuant to this object of the invention, the valve stem is desired to be secured to the diaphragm by means disposed above the diaphragm. These means are attachable and detachable to permit separation of the diaphragm and valve stem. Thus, a central opening in the diaphragm comprises means for releasably gripping the upper end of the valve stem when it is inserted therethrough. Attachment of the means securing the valve stem to the diaphragm is thereby facilitated.

A constructional feature of the present invention is found in a regulator which comprises housing means defining a fluid flow passage having an inlet portion, an outlet portion and orifice means intermediate the inlet and outlet portions. A diaphragm defines an upper portion of a pressure sensing chamber in one of the flow passage portions. The housing means comprise a fluid passage housing in which the inlet and outlet portions and the orifice means and the pressure sensing chamber are formed, and a spring housing. Means are provided to secure the spring housing on the fluid passage housing and clamp the peripheral margin of the diaphragm therebetween. Valve means comprising a stem are disposed in axial alignment with the orifice. The upper end of the stem extends through and projects above the diaphragm. Means, disposed above the diaphragm, detachably mount the valve stem thereon. Spring means, disposed in the spring housing, resist upward displacement of the diaphragm.

This regulator is characterized by the spring means comprising a compression spring and a lower spring retainer, which is disposed above the diaphragm and is upwardly separable from the diaphragm and the means for releasably clamping the valve stem.

The foregoing constructional feature of the invention provides a basis for various, cooperating features, which further contribute to attaining the foregoing ends.

The above and other related objects and features of the invention will be apparent from a reading of the following description of preferred embodiments, with reference to the accompanying drawings, and the novelty thereof pointed out in the appended claims.

IN THE DRAWINGS:

FIG. 5 is an elevation, partly in section, of a spring housing assembly, seen in FIG. 1, dissembled from a flow passage assembly;

FIG. 6 is an elevation, partly in section, of the flow passage assembly, with the spring assembly removed;

FIG. 8 is an elevation, in longitudinal section, of another alternate embodiment of the invention, which is particularly adapted for use in systems where negative pressures are generated in the regulator;

FIG. 9 is a view, on an enlarged scale, of portions of FIG. 8;

FIG. 10 is a plan view of the pressure regulator seen in FIG. 7; and

The use of pressure regulators in fluid conduit systems is well known and exemplification of such use is not required for an understanding of the present invention. Suffice it to say that a pressure regulator comprises a fluid flow passage having an inlet portion and an outlet portion, with variable orifice means interposed therebetween for automatically controlling the pressure in either the inlet portion, or the outlet portion, independently of variations in the pressure of the other portion.

Figure 1:
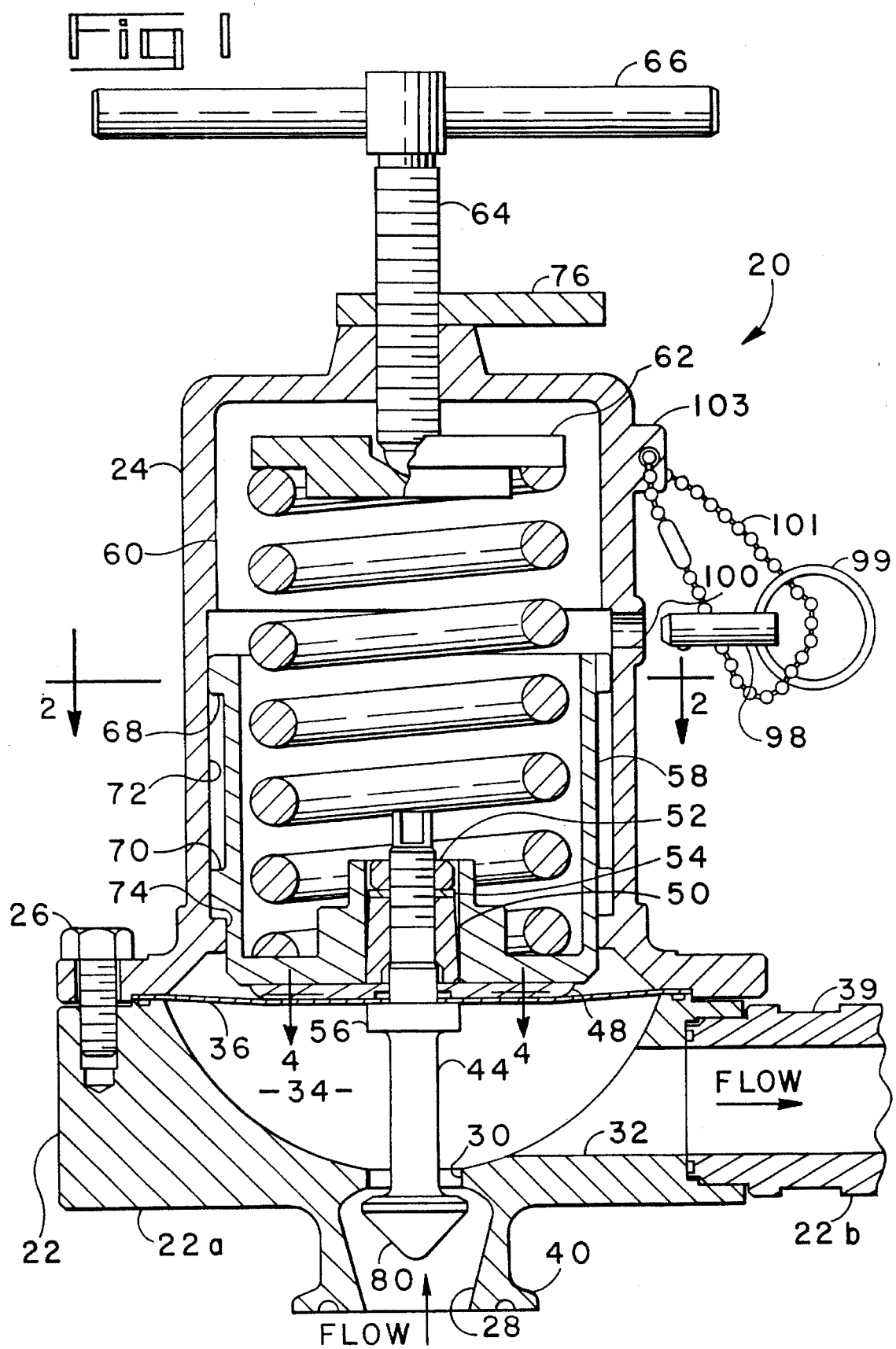
FIG. 1 is an elevation in longitudinal section of a sanitary flow regulator embodying the present invention.

FIG. 1 illustrates a pressure regulator 20 adapted to control or limit the downstream pressure of a fluid system in which it is incorporated.

Figure 3:
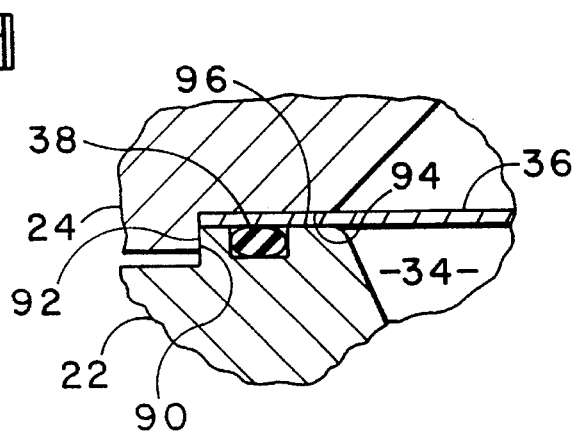
FIG. 3 is a section, on an enlarged scale, of a portion of FIG. 1, illustrating in greater detail the connection between a flow passage housing and a spring housing.

The pressure regulator 20 comprises a fluid conduit housing 22 and a spring housing 24, which are joined in assembled relation by bolts 26. The fluid housing 22 comprises, in series flow relation, an inlet passage 28, a valve orifice 30 and a discharge passageway 32. A pressure sensing chamber 34 is provided downstream (above) of the valve orifice 30, with its upper portion being defined by a thin metal diaphragm 36 having a circular outline. The marginal, peripheral portion of the diaphragm 36 is clamped between the spring housing 24 and the fluid housing 22 (see also FIG. 3). More specifically, the diaphragm 36 is clamped against an O-ring 38, which is disposed in an annular groove concentric of the diaphragm 36.

The fluid housing 22 is, preferably, compositely formed, comprising a main body 22a and an outlet unit 22b which is threadably mounted on the main body and forming the downstream portion of the outlet passage 32. The outlet unit 22b is provided with flats 39 to facilitate its being threaded into the main body 22a. The inlet end of the inlet passage 28 is provided with a flange 40 and the outlet end of the outlet passage is provided with a flange 42 (FIG. 6). The flanges 40, 42, respectively facilitate mounting of the pressure regulator in fluid communication with pipes, or conduits, of a fluid flow system in which pressure regulation is to be provided.

The provision of housing components 22a and 22b enable those components to be economically formed from bar stock, as by a turning on a lathe. This is preferred to the alternative of forming the fluid housing 22 from a casting.

As previously discussed, the need for assurance in aseptically cleaning the liquid contacted surfaces of the flow regulator dictates that stainless steel (or equivalent) be used as the material. Further, it is highly desirable, that the flow defining surfaces be smooth. In many cases they are polished. This end is assured by employing stainless steel bar stock in forming the components 22a and 22b. Such assurance is not had by the alternative of casting the liquid housing as a single, unitary component. This is to recognize that voids and other casting defects can result in unacceptably rough, flow defining surfaces, even when those surfaces are machined and polished.

A valve stem 44 is mounted on and projects axially downwardly from the diaphragm 36. The upper end portion of the stem 44 projects through a central opening 46 (FIG. 4) in the diaphragm 36, though a disc (upper diaphragm plate) 48, and through a bushing 50. This assembly is held in assembled relation by a nut 52, threaded on to the upper end of the stem 44 and acting against a lock washer 54 to clamp the assembly against a stem collar 56 which underlies the diaphragm 36.

A cup shaped, lower spring retainer 58 is telescoped over the bushing 50 and receives the lower end of a compression spring 60. The upper end of the spring 60 engages a disc (upper spring retainer) 62. An adjusting screw 64 is threaded through the top of the spring housing 24 and is provided with a handle 66 to facilitate rotation of the screw 64 in adjusting the initial compression of the spring 60, which, in turn, controls the pressure to which the fluid will be regulated.

Figure 2:
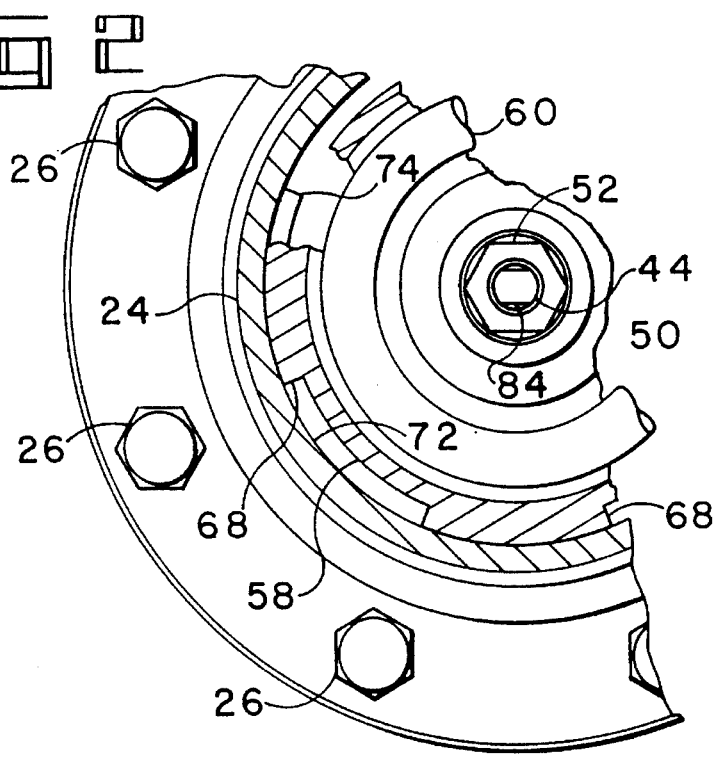
FIG. 2 is a section taken generally on line 2—2 in FIG. 1.

Further reference is made to the lower spring retainer 58, which is guided for upward, sliding movement relative to the spring housing 24 by an upper row of angularly spaced lugs 68 and a lower row of axially aligned, angularly spaced lugs 70 (see also FIGS. 2 and 5). The lugs 68, 70 slidably engage a bore 72 at the lower end of the spring housing 24. Angularly spaced lugs 74 project inwardly from the spring housing 24 at the lower end of the bore 72. The spring 60 yieldably maintains the spring retainer 58 in a lower position, which is established by engagement of the lugs 70 with the lugs 74.

The angular spacing of the lugs 68, 70 and 74 provide a bayonet arrangement which facilitates assembly and disassembly of the spring retainer 58. This is to point out that the angular spacing between the aligned lugs 68, 70, is greater than the width of the housing lugs 74. This permits the spring retainer 58 to be telescoped into the bore 72, with the lugs 68, 70 aligned with the spaces between the lugs 74. The spring retainer 58 may then be rotated 45° to align the lugs 70 with the lugs 74.

The spring 58 has a relative high spring rate, which can be as much as 1,400 pounds per inch, or more. To further facilitate assembly, it is preferred that the upper spring retainer 62 be capable of being retracted upwardly to a position in which the free length of the spring 58 can be accommodated between the spring retainers 58, 62, when the lower retainer 58 is in its assembled relation on the spring housing 24. After assembly, the screw 64 is rotated to precompress the spring 58 to the desired degree. A lock nut 76, having a laterally projecting lever portion, may then be rotated to lock the adjusting screw in the position that provides the desired spring pressure.

While unique in construction, the regulator 20 functions to regulate liquid pressure downstream of the valve orifice 30 in a conventional fashion. This is to say that when this downstream pressure exceeds a desired value (which could be the result of an increase in pressure in the conduit system upstream of the orifice or a restriction in liquid flow downstream of the orifice) the stem 44 is displaced upwardly to bring a plug 80 into a position reducing flow through the orifice 30 and a consequent reduction in the pressure downstream thereof.

More specifically, this end is the result of an increase in pressure in the pressure sensing chamber 34 sufficient to produce a force on the diaphragm 36 that exceeds the downward force of the spring 58, acting through the lower spring retainer 58 and the disc 48.

The extent of axial movement of the stem 44 and the relationship of the plug 80 to the orifice 30, as well as the spring rate of the spring 60, are all within the abilities of one skilled in the art to quantify for purposes of establishing a desired pressure or range of pressures to be maintained by the pressure regulator 20.

In connection with the dynamic operation of the regulator 20, pressure and flow restrictions can vary at a relatively high rate, with the result that the stem can be continuously displaced upwardly by pressure in the chamber 34 and then returned to the illustrated position of FIG. 1, or some intermediate position, by the spring 60. It is also possible for the pressure in the outlet passage 32/pressure sensing chamber 34 to exceed the upstream pressure to the end that the plug 80 is engaged with the entrance to the orifice 30 and closes flow therethrough.

When this occurs, upward movement of the stem 80 is limited by engagement of the plug 80 with the entrance to the orifice 30. Upward fluid forces on the diaphragm 36 are resisted by the disc 48, so that flexure of the diaphragm 36 is first limited by the limited upward movement of the stem 44. Flexure of the diaphragm is further confined to the annular portion between the disc 48 and the housings 22, 24, between which the diaphragm 36 is clamped. By thus limiting the extent to which the diaphragm 36 is flexed and by confining flexure to the outer annular portion of the diaphragm minimizes stresses and increases the working life of the diaphragm.

The present valve uniquely provides this regulation function in a fashion that meets the specialized needs of the food and beverage industry and other similar industries where utmost care is required in avoiding contamination.

One aspect of these requirements is the minimization of "wetted" surfaces (flow defining surfaces) which could cause pressure loss, or otherwise lead to the creation or buildup of solids. Additionally, it is desired to minimize "wetted surfaces" which would be difficult to clean. To this end, it is desired, and the present invention so achieves, that threaded members be completely eliminated from the flow defining surfaces and the flow passage defined thereby. It is particularly to be noted that the stem 44 has been mounted in axial relation with the orifice 30, without having any threaded connections exposed to the liquid flow path through the regulator. This end is also achieved with a cantilever type mounting, which reliably positions the stem without employing sliding surfaces, within the flow stream, which could be a source of particulate generation.

In addition to meeting the foregoing requirements relating to elimination of threaded surfaces the present invention also facilitates another requirement of food and beverage liquid handling equipment in being readily and easily cleanable. In this connection there are two cleaning procedures. One procedure, known as clean-in-place is simply to pass steam (steam-in-place) and/or pressurized cleaning agents through the fluid handling systems. Another procedure is additionally, or as an alternative, to access the "wetted surfaces" of the regulator and mechanically (by a brush, for example) clean them, this also being known as contact cleaning. Both cleaning procedures are facilitated by the present invention.

Accurate mounting of the stem 44 in operative relation to the orifice 30 is achieved through operative relations with the lower spring member 58.

Initially, the stem 44 is inserted upwardly through the orifice 30, before connection of a conduit to the flange 40. The metal diaphragm 36 is then telescoped over the upper end of the stem 44. At this point, it will be noted (FIG. 4) that the opening 46 is characterized by four notches, which define tabs 82. The tabs 82 function as leaf springs to releasably grip the stem 44. This enables the stem 44 to be released in completing the steps of mounting it on the diaphragm 36.

This involves telescoping the disc 48, bushing 50 and lock washer 54 into the assembled relation of FIGS. 1 and 6. The nut is then threaded onto the stem 44. It is to be noted that the upper end of the stem 44 comprises a non-circular portion, defined by flats 84, which is engageable by a wrench to torque the stem 44 as another wrench is used to tighten the nut 52.

The assembled diaphragm 36/stem 44 and fluid conduit housing 22, seen in FIG. 6, comprise a conduit sub-assembly, identified by reference character 86.

The spring housing 24, spring 60 and lower spring retainer 58 and related parts comprise a separate subassembly unit seen in FIG. 5, and identified by reference character 88.

The spring housing sub-assembly 88 is simply put in place on top to the conduit assembly 86 and the bolts 26 tightened to complete assembly of the regulator 20.

An important factor to be noted is that the stem 44 is accurately positioned in coaxially relation with the valve orifice 30. This end is attained by an accurate positioning of the spring housing 24 relative to the conduit housing 22 provided by a machined, annular surface 90 on the housing 24 and a machined annular shoulder 92 on the conduit housing 22. Further the lower spring retainer 58 has a central bore 93 (FIG. 6) which is accurately concentric of the sliding/guiding surfaces of the lugs 68, 70. In turn, the bore 72 (engaged by the lugs 68, 70) is accurately concentric with the annular surface 90. The common, vertical axis for the locating surfaces of the spring housing sub-assembly 88 is also normal to a radial surface 94, extending inwardly from the surface 90.

The orifice 30 may be readily formed concentrically of the annular shoulder 92 and normal to an inwardly extending surface 96.

When the spring housing sub-assembly 88 is mounted on the conduit housing sub-assembly 86, the stem 44 is accurately positioned coaxially of the orifice 30, by the bushing 50 (which is concentric of the stem 44) entering the bore 93 as the spring housing 24 is positioned relative to the conduit housing 22 by the positioning surfaces 90/92 and 94/96. The diaphragm 36 has a uniform thickness. Thus the fact that it is interposed between the positioning surfaces 94, 96 does not affect the accuracy of the positioning function of these surfaces.

From the foregoing descriptions of the conduit subassembly 86 and spring housing subassembly 88, it will be apparent that subassemblies also facilitate gaining access to the "wetted surfaces" of the regulator 20 for contact cleaning. This is to say, that the assembled valve, as illustrated in FIG. 1, can readily be accessed by removing the bolts 26 and lifting the subassembly 88, as illustrated in FIG. 5, therefrom. (A quick release connecting means, as later described in connection with FIG. 7, can further facilitate removal of the spring subassembly 88.)

Once the spring housing subassembly 88 is removed, the nut 52 can be removed from the stem 44 and then the diaphragm 36 disassembled from the stem to provide access to the wetted surfaces of the regulator for contact cleaning thereof.

An alternate to contact cleaning is clean-in-place cleaning. This is frequently done with steam, in which case it is known as steam-in-place cleaning. In either event the conduit system, in which the regulator is incorporated, is flushed with a pressurized, cleaning fluid. In order for the cleaning function to be effective, it is necessary that the cleaning fluid be able to flow freely through the conduit system and the regulator in particular.

To achieve this end it is necessary that the pressure regulating function be disabled because the pressures employed are such that the valve stem 44 will be displaced upwardly to substantially reduce flow and limit the pressure available for cleaning purposes. Disablement is provided by selectively locking the stem 44 against upward movement. Specifically, a pin 98 is inserted through a hole 100 in the vertical wall portion of the spring housing 24. The pin 98 is thus positioned in overlying relation with and closely spaced from the upper end of the cup shaped, lower retainer 58. The lower retainer 58 is thus locked against upward movement and thereby prevents the diaphragm 36 from being flexed upwardly by increases in pressure in the sensing chamber 34. The stem 44 is prevented from being displaced upwardly and the plug 80 is spaced below the orifice 30 for maximum flow therethrough.

The pin 98 is tethered to the spring housing 24 by a ring 99 and a chain loop 101, which is connected to a lug 103 on the housing 24. It is preferred to provide a warning label (not shown) reminding that the pin 98 must be removed in the normal operation of the regulator, wherein the downstream pressure is to be controlled.

Figure 7:
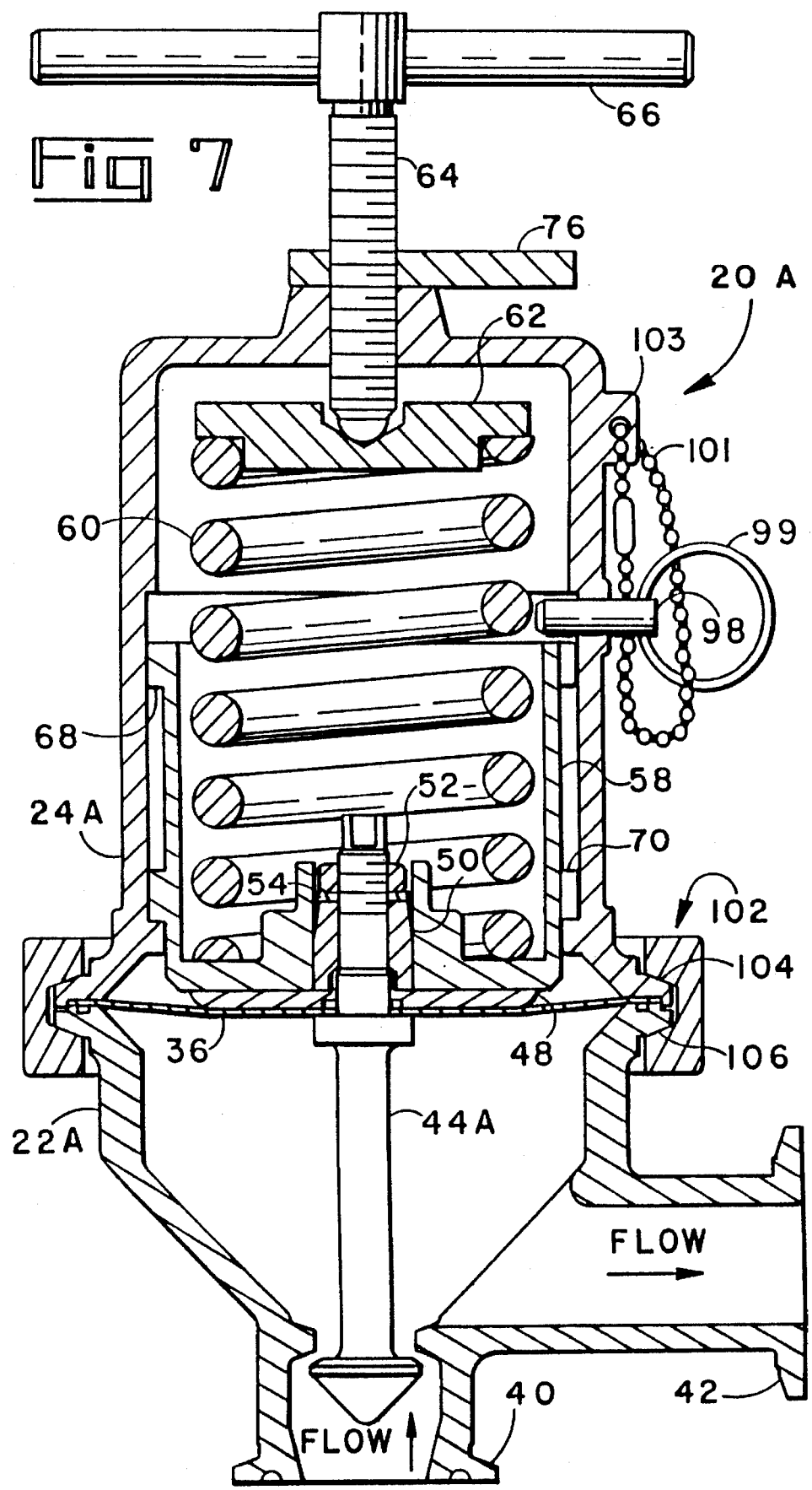
FIG. 7 is an elevation, in longitudinal section, of an alternate embodiment of the invention, which is particularly adapted to facilitate contact cleaning of the flow passages.

An alternate embodiment of the invention is illustrated by a pressure regulator 20A seen in FIGS. 7 and 10.

This regulator is identical with the regulator 20 previously described, excepting for the manner in which spring housing 24A is joined to fluid passage housing 22A. (Also housing 22A is illustrated as a one piece casting.) In this case a removable ring clamp 102, having a "C" section is employed as the joining means. The housings 22A, 24A are modified to provide angled, angular flanges 104, 106. The "C" section of the ring 102 embraces the opposed surfaces 104, 106 to prevent their separation and thereby to maintain the housings 22A, 24A in assembled relation.

The ring clamp 102 comprises multiple arcuate sections to it its rapid assembly to join the housings 22A, 24A and its assembly when the spring housing 22A and spring housing assembly 88 is to be removed from the fluid passage housing 24A and it subassembly 86.

"C" section ring clamps are well known in the art as a for quickly joining flanged components. A widely used form this clamp comprises the central arcuate section 102b having further arcuate sections 102a, 102c pivotally mounted thereto for swinging movement in the plane of the clamp. The free ends of the further arcuate sections 102a, 102c are provided with lugs 103. A clamping nut 105 is threaded onto a pivoted pin 107, releasably joins the segments into a compositely formed, structural ring to provide the function of clamping the housings 22A, 24A in assembled relation.

While "C" section clamping rings are, per se, known, the present invention is readily adapted to their use, and the use of such clamping rings is preferred as a means for quickly dissembling the spring housing 24A from the fluid passage housing 22A in order to quickly access the wetted surfaces of the regulator 20A for contact cleaning thereof.

The regulator 20A functions in a fashion identical with that of the previously described regulator 20. The components of the regulator 20A are the same as in the regulator 20, except for the noted changes in the joining means and are identified by like reference characters, without further description.

It will be briefly noted that the fluid passage 22A is illustrated as being a single piece casting, as opposed to the composite, lathe turned housing of FIG. 1. This is to illustrate that, under appropriate circumstances, a cast construction can be employed in practicing the present invention.

Reference is next made to an embodiment of the invention which is particularly adapted for use in conduit systems in which negative pressures develop in the flow passages. This embodiment of the regulator is illustrated in FIGS. 8 and 9 and identified by reference character 20B.

The regulator 20B comprises a compositely formed fluid passage housing 22 having an inlet passage portion 28, an orifice 30 and an outlet passage portion 32, in series flow relation. Likewise a pressure sensing chamber 34 is defined by the housing 22 and an overlying diaphragm 36.

Valve means control flow of fluid through the orifice 30 in the same fashion as before. The valve means include a stem 44B which projects downwardly from the diaphragm 36, with the plug 80 disposed beneath the orifice 30, in the inlet portion 28. The upper end of the stem passes through the diaphragm 36, a disc 48 above the diaphragm 36, and then through a bushing 50, all as in the first embodiment. There is an additional disc 108 disposed between the underside of the diaphragm 36 and a collar 56, which is formed integrally with the stem 44B. An O-ring 110 provides a seal between the disc 108 and the portion of the stem 44B passing therethrough. An O-ring 112, disposed in an annular groove in the disc 108, provides a seal between the disc 108 and the diaphragm 36. The assembly comprising the discs 48, 108 and bushing 50 is secured against the stem collar 56 by a nut 52 and lock washer 54.

Figure 4:
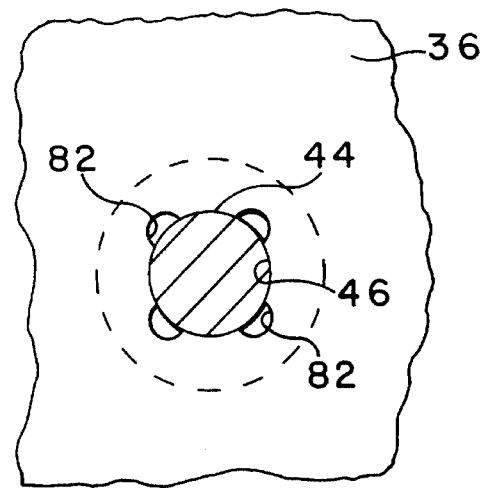
FIG. 4 is a section, on an enlarged scale, taken on line 4—4 in FIG. 1.

In the initial assembly of the regulator 20B, the stem 44B is inserted through the inlet passage portion 28 and then its upper portion is inserted through the orifice 30. The disc 108 is then telescoped over the upper end of the stem 44B, with the O-rings 110, 112 in place. The diaphragm 36 is then positioned on the stem 44B. The diaphragm 36 has a central opening, as shown in FIG. 4, with spring tabs 82 for gripping the stem 44B to facilitate this assembly.

The remainder of the assembly is then completed by threading the nut 52 onto the stem 44B. This step, as before, is facilitated by flats 84 on the uppermost end of the stem 44B which permits it to be gripped by a wrench as another wrench tightens the nut 52.

An annular, housing collar 114 is disposed on the fluid passage housing 22, between that housing and a spring housing 24B. The collar 114 may placed on the housing 22, with the diaphragm 36 therebetween, after the stem 44B has been mounted on the diaphragm 36.

With the collar 114 in place, a lower spring retainer 58 is next telescoped over the upper end of the stem 44B, with the bushing 50 being received by a central bore 93 in the retainer 58. Next, the lower spring retainer 58 is secured to the stem 44B in fixed axial relationship. This end is attained by a recessed collar 116, the upper end of which is locked by snap ring 118 that is removably secured to the upper end of the stem 44B, so that the lower end of the recessed collar 116 engages the upper end of a central hub portion of the lower retainer 58.

After connecting the lower spring retainer 58 to the stem 44B, a compression spring 60 is positioned in the retainer 58 and an upper spring retainer 62 positioned thereon. The spring housing 24B is then mounted on the fluid passage housing 22. As in the previous embodiment, an adjusting screw 64 is threaded into the upper end of the spring housing 24B. Preferably, assembly of the housing 24B is made before the screw is threaded into the housing, or if it has been threaded therein, it is rotated to an upper position. This is done so that there will be no compression of the spring 60 in mounting the housing 24B. Again the free height of the spring 60 and upper retainer 62 is less than the interior height of the housing 44B to attain this end of facilitating assembly. The assembled housing 24B is secured in assembled relation by bolts 26, threaded into the fluid passage housing 22. The bolts also clamp the collar 114 and the peripheral margin of the diaphragm 36 in assembled relation.

It is to be noted that the spring housing 24B is provided with a bore 72 which slidingly receives axially spaced lugs 68 and 70 on the lower retainer 58. After the spring housing 24B is mounted, the adjusting screw is threaded downwardly to preload the stem 44B in its lower, open position, which is limited by engagement of the retainer lugs 70 with the underlying, inwardly projecting portions of the collar 114. (The collar 114 functions in an equivalent fashion to the lugs 74 of the spring housing 24 in the previous embodiment to limit downward travel.)

The regulator 20B functions in the same basic fashion as the previously described regulator 20. When the pressure in the outlet passage portion 32 increases beyond a given pressure, the upward force on the diaphragm 36 exceeds the downward force of the spring 60. When this occurs, the stem 44B is displaced upwardly to reduce flow through the orifice 30. This results in a throttling action, which, by way of a negative feedback, creates a force balance on the diaphragm 36 and positioning of the stem 44B and its plug 80 so that the pressure downstream of the orifice 30 does not exceed a desired maximum value.

It is to be noted that the stem 44B is mounted in cantilevered fashion on diaphragm 36 and is axially aligned with the orifice 30 in essentially the same fashion as in the embodiment of FIG. 1. There is a further set of aligning surfaces which position the collar 114 with respect to the spring housing 24B and the position the collar 114 with respect to the fluid passage housing 22. Thus the collar has an annular surface 90b which engages an annular positioning shoulder 92, on the fluid passage housing 22. The collar 114 also has a concentric, annular positioning surface 92b, which engages and is concentrically positioned by the bore 72. Axial alignment of the stem 44B with the orifice 30 by parallel annular surfaces comprising surface 96 on the housing 22, which engages surface 94b on the collar 114, and surface 96b also on the collar 114, which engages surface 94 on the spring housing 24B.

The valve 20B is also readily cleaned-in-place or steamed-in-place. When this is done, a pin 98 is inserted in a hole 100 in the spring housing 24B in overlying relation to the lower spring retainer 58. The valve stem 44B is thereby locked in a lower, open position, which will be maintained when the conduit system and the flow passages are pressurized in the cleaning process.

An advantage of the regulator 20B is that it is able to withstand repeated cycles of negative pressure in the fluid conduit system. This is to point out that there are situations incident to the process control of fluids in which a negative pressure will be created in the flow passage of the fluid passage housing 22, and the pressure sensing chamber 34 in particular.

When the pressure in the chamber 34 becomes negative, to the end that there is a pressure effective on the upper surface of the diaphragm 36/disc 48 tending to draw it downwardly and to displace it away from the lower spring retainer 58. Such downward displacement of the diaphragm 36 would unduly stress the diaphragm, limiting its working life and requiring its frequent replacement.

The provision of means which prevent the diaphragm 36 from moving downwardly, independently of the lower retainer 58 prevent excessive flexure of and undue stresses in the diaphragm, when there are negative pressure excursions in the sensing chamber 34. These means comprise the snap ring 118 and the recessed collar 116.

For purposes of minimizing stresses in the diaphragm 36 it is further preferred to limit flexure of the diaphragm 36 to its outer annular portion. To this end the lower disc 108 is clamped against the undersurface of the diaphragm 36 and, preferably, is sealed with respect thereto by the O-rings 110, 112, The O-rings 110, 112 also seal the interfaces between the disc 108 and the diaphragm 36/stem 44B. By so sealing these interfaces, they do not become wetted, or the degree to which they become wetted is minimized, all of which facilitates their cleaning, as when there is to be a change in the fluid flowing through the regulator.

Figure 11:
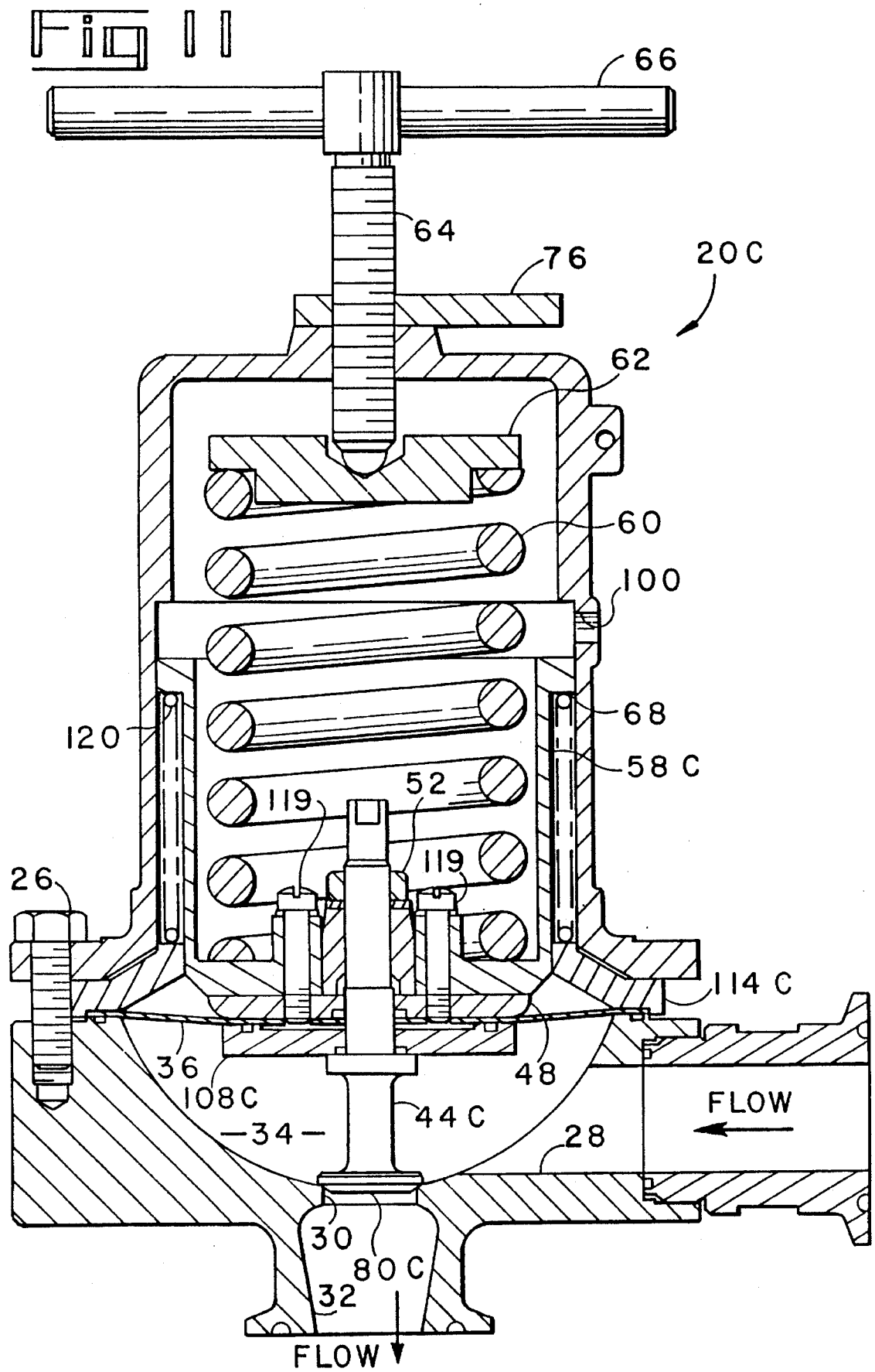
FIG. 11 is an elevation, in longitudinal section, of another embodiment of the invention, which is adapted to regulating the fluid pressure upstream of the regulator.

Reference is next made to FIG. 11 for a description of a further, alternate regulator, identified by reference character 20C. This is a back pressure embodiment of the invention, which is adapted to control, or regulate, the fluid pressure upstream of the regulator.

Very briefly, the regulator comprises essentially the same elements as found in the embodiment of FIG. 8, being distinguished by a valve stem 44C which is in a normally closed position relative to an orifice 30. A detailed description will be given only for the portions of the regulator which have been modified to obtain regulation of upstream pressure.

There is a compositely formed, flow passage housing 22 which may be unmodified structurally, but with the flow direction reversed. Thus, the horizontal passage is an inlet passage 28, entering into a pressure sensing chamber 34, with fluid flow being through an orifice 30 to an outlet passage 32C, when valve means including a stem 44C and plug 80C are raised to an open position.

The regulator 20C includes a diaphragm/valve stem subassembly comprising a diaphragm 36C, valve stem 44C, lower disc 108C, upper disc 48 and bushing 50, which are held in assembled relation by nut 52 and lock washer 52. This Subassembly is mounted, as before, on the compositely formed, fluid passage housing 22. The diaphragm 36C overlies and defines the upper surface of the pressure sensing chamber 34.

As in the embodiment of FIG. 8, the valve stem 44C is secured in fixed axially relation to a lower spring retainer 58C. The lower spring retainer 58C is telescoped over and positioned on the upper end of the stem 44C, which is likewise positioned by bushing 50. Alternate means for so securing the spring retainer 58C comprise a pair of screws 119 extending through the hub of the lower spring retainer 58C and threaded into the disc 48.

The diaphragm 36 is modified to the extent that it comprises an annulus having a relatively large diameter, this being the outer annular portion of the previous embodiment to which flexure has been confined. The annular diaphragm 36 also includes marginal portions permitting its outer periphery to be clamped between a collar 114C and the flow passage housing 22 and also permitting the inner peripheral to be clamped between the discs 48 and 108C. The disc 108C has a central recess defining a peripheral flange which provides a preferred clamping action against the inner periphery of the diaphragm 36C, as well as clearance for the ends of the screws 119.

The lower spring retainer 58C is mounted in and positioned by the spring housing 24B in a fashion similar to that of the regulator 20B. Thus, a collar 114C is disposed above the diaphragm 36. The spring housing 24B is mounted on the fluid passage housing 22 by bolts 26 and clamps the collar 114C against the diaphragm 36.

The functional components comprise a spring 60 which is positioned in the retainer 58C. An adjusting screw 64 is threaded through the upper end of the spring housing 24B and is engageable with an upper spring retainer.

In the assembled condition of the regulator 20C, the lower position of the valve stem 44C is defined by engagement of a stem head 80C with the inlet to the orifice 30. Thus, it is no longer necessary, or desirable, to define the lower position valve stem by limiting the downward movement of the lower spring retainer (58), as in the previous embodiments.

To his end, the lower lugs (70) on the lower spring retainer have been eliminated. Also, the lower spring retainer is guided for axial movement by upper lugs 68 which slidably engage a bore 72 on the interior of the spring housing 24B and by a lower diametrical surface on the retainer 58C, which slidingly passes through the collar 114C. It is to be appreciated that in all embodiments, the lower spring retainer is guided for axial movement by journal surfaces, which are on a relatively large diameter and also have a substantial axial spacing of half a diameter or more. This factor contributes to the accuracy attained in aligning the stem with the orifice (30), as well as assuring that there will be no binding, which would inhibit the ability of the stem (44) to be positioned as a function of the pressure in the sensing chamber (34).

In operation, the valve plug 80C closes orifice 30 until the pressure on the diaphragm 36C is sufficient to overcome the adjustable force of the spring 60. When this occurs, there is flow of fluid through the orifice 30 into and out of the outlet passage 32. Assuming that there is sufficient upstream pressure there will be an equilibrium condition in which the force on the diaphragm 36 balances the spring (60) force, thereby positioning the valve stem 44C in an open position. The pressure in the fluid conduit system, upstream of the orifice 30 is thus maintained at a desired maximum level.

When it is desired to sanitized the regulator 20C by a clean-in-place or steam-in-place method, it is not necessary to provide means for opening the orifice 30, since, usually, it is possible to employ a cleaning medium with sufficient pressure to cause the stem 44C to be displaced to a position in which the orifice 30 is open.

However, in the cleaning process it is also essential that the regulator be capable of freely draining. The normally closed position of the valve stem 44C frustrates this end.

Drainage is provided by yieldingly mounting the lower retainer 58C in the spring housing 24B. More specifically, a spring 120 is disposed between the collar 114C and the retainer lugs 68. When it is desired to clean the regulator 20C, the screw 64 is unthreaded a distance sufficient to permit the spring 60 to extend to its free height. Thereafter, further unthreading of the screw 64 permits the spring 120 to raise the retainer 58C to a position in which the valve plug 80C is spaced from the orifice 30. It is to be appreciated that the spring 120 has a relatively low spring rate, namely a rate only sufficient to displace the stem/lower retainer/spring/upper retainer to an upper position, when the screw 64 is threaded upwardly to permit the spring 60 to assume its free length. It is also to be appreciated that the screw 64 will be further unthreaded to permit the lower retainer 58C to be raised by the spring 120, to a position in which the plug 80C is spaced from the orifice 30, in an open position.

This end is facilitated by the stem 44C being axially locked to the lower retainer 58C, employing the optional use of the screws 119. This axially locking and the lower disc 108C also minimize the stresses on the diaphragm 36C when there are negative pressures in the regulator, as discussed in connection with the previous embodiment.

It is to be noted that in the illustrated, unpressurized condition of the regulator (FIGS. 1, 7, 8 and 11), the diaphragm 36 is displaced downwardly by the spring 60 from its untensioned, flat condition. In operation, an increase in the pressure in the sensing chamber 34, when it exceeds the preload force of the spring 60, first returns the diaphragm to its flat condition and then bows it upwardly. This arrangement minimizes the stresses in the diaphragm, to the end of increasing its working life.

It is to be appreciated that the present design incorporates many components which can be used, without modification, as common components in regulators providing differing advantages, all directed to providing a sanitary regulator, which is readily sterilized/cleaned and which minimizes the generation of particulates as fluids flow through the regulator. This is evidenced by the use of the same reference character for the same, or substantially the same, common components in different embodiments above disclosed and described.

It is to be appreciated that, in many aspects of the invention, diaphragm formed of elastomeric materials can be employed in place of the metal diaphragm specifically discussed. However, for sanitary valve purposes, metal diaphragms, and particularly stainless steel diaphragms are preferred and the present invention facilitates their use.

It is thus to be appreciated that variations, from the specific embodiments herein described, will occur to those skilled in the art, within the spirit and scope of the present inventive concepts, as defined in the following claims.

Having thus described the invention, what is claimed as novel and desired to be secured by Letters Patent of the United States is:

1. A pressure regulator comprising housing means defining a fluid flow passage having an inlet portion, an outlet portion and orifice means intermediate the inlet and outlet portions, a diaphragm defining, in part one of said flow passage portions, valve means mounted on said diaphragm for movement relative to said orifice means and controlling the effective area of the orifice means as a function of its position relative to the orifice means, means for positioning said valve means, relative to said orifice means, as a function of pressure in one of said flow passage portions, characterized in that said valve means is guided for movement relative to said orifice means solely by means disposed outwardly from said fluid flow passage, which means are not wetted by fluid flowing through the fluid flow passage, whereby cleaning of the regulator is facilitated through by the absence of relative sliding movement between the valve means and a wetted surface of the fluid flow passage.

2. A pressure regulator as in claim 1 characterized in that the orifice means comprises an orifice, said valve means comprises a valve stem extending through said orifice and terminating in a plug disposed within the passage inlet portion, said stem and plug being spaced from the orifice and said inlet portion.

3. A pressure regulator comprising housing means including a fluid passage housing defining a fluid flow passage having an inlet portion, an outlet portion and orifice means intermediate the inlet and outlet portions, valve means, including a valve member, mounted for movement relative to said orifice means and controlling the effective area of the orifice means as a function of its position relative to the orifice means, means for positioning said valve means, relative to the orifice, as a function of pressure in one of said flow passage portions to thereby control the outlet pressure, wherein the housing means further comprise a spring housing, and the means for positioning said valve means comprise a spring mounted within said spring housing, characterized in that the spring is releasably mounted in the spring housing by means comprising a lower spring retainer mounted in the lower end portion of the spring housing by means engageable with the inner wall of the spring housing, said lower spring retainer being releasably mounted for removal from the lower end of the spring housing, and the spring housing with the spring retained therein by the lower spring retainer, are separable from said valve member and are removably mounted, as a unit, on the fluid conduit housing.

4. A pressure regulator as in claim 3 wherein the spring is a compression spring, and further comprising means for adjusting the degree to which the compression spring is compressed, and further characterized in that the means for adjusting the degree to which the compression spring is compressed comprises an upper spring retainer positioned on top of the compression spring and an adjusting screw threaded through the upper end of the spring housing and engageable with the upper spring retainer, whereby the adjustment of the compression spring is not affected by removing and then remounting the spring housing and compression spring on the fluid passage housing.

5. A pressure regulator comprising housing means defining a fluid flow passage having an inlet portion, an outlet portion and orifice means intermediate the inlet and outlet portions, valve means mounted for movement relative to said orifice means and controlling the effective area of the orifice means as a function of its position relative to the orifice means, means for positioning said valve means, relative to said orifice, in a closed position until the pressure in one of said flow passage portions exceeds a given value and positioning said valve in a position maintaining a substantially constant pressure in said one portion, said positioning means including spring means for yieldingly urging said valve means to a closed position and means for adjusting the spring force acting on said valve means, characterized in that the adjusting means are adjustable to reduce the spring force to substantially a zero value, and yieldable means are provided for overcoming the spring force so that the valve means is in an open position, whereby the valve means can be maintained in an open position to facilitate its being drained during a cleaning procedure.

6. A pressure regulator as in claim 5 further characterized in that the valve means comprise a valve stem having a plug for controlling flow of fluid through said orifice, the positioning means comprise a lower spring retainer on which the valve stem is mounted, a first compression spring disposed above the lower spring retainer, the adjusting means are effective on the upper end of the first compression spring to reduce its length and thereby yieldably maintain the valve stem in a closed position defined by engagement of the valve stem plug with the inlet to said orifice, and said yieldable means comprises a second compression spring having a relatively low spring rate and effective to said lower spring retainer to urge it in a direction displacing said valve stem to an open position, said adjusting means having an adjusted position in which the first compression spring is permitted to extend substantially to its free length and, further, the second compression spring is permitted to extend a distance sufficient for the valve stem to be displaced to an open position.

7. A pressure regulator comprising a fluid passage housing defining, at least in part, a fluid passage which includes, in series flow relation:

an upwardly extending inlet portion, an orifice, a pressure sensing chamber, and an outlet portion, a horizontally disposed diaphragm defining the upper surface of the pressure sensing chamber, valve means for controlling the flow area through said orifice, said valve means comprising a valve stem projecting downwardly from said diaphragm, through said orifice and having a plug disposed in said passage inlet portion, said valve stem also having an upper portion projecting through a central opening in said diaphragm, characterized in that the valve stem is secured to the diaphragm by means disposed above the diaphragm, said means being attachable and detachable to permit separation of the diaphragm and valve stem, and further characterized in that the central opening comprises means for releasably gripping the upper end of the valve stem when it is inserted therethrough, to thereby facilitate attachment of the means securing the valve stem to the diaphragm.

8. A pressure regulator as in claim 7, further characterized in that the means for releasably gripping the upper end of the valve stem comprise a plurality of integral, spring tabs, which compositely define the central opening in the diaphragm so that its effective diameter is slightly less than the diameter of the portion of the valve stem disposed therein.

9. A pressure regulator comprising housing means defining a fluid flow passage having an inlet portion, an outlet portion and orifice means intermediate the inlet and outlet portions, a diaphragm defining an upper portion of a pressure sensing chamber in one of said flow passage portions, said housing means comprising a fluid passage housing in which the inlet and outlet portions and the orifice means and the pressure sensing chamber are formed, and a spring housing, means securing said spring housing on the fluid passage housing and clamping the peripheral margin of the diaphragm therebetween, valve means comprising a stem projecting downwardly from the diaphragm and disposed in axial alignment with said orifice, means, disposed above said diaphragm, for detachably mounting the valve stem thereon, spring means, disposed in said spring housing, for resisting upward displacement Of said diaphragm, said spring means comprising a compression spring and a lower spring retainer, which is disposed above the diaphragm and is upwardly separable from the diaphragm and the means for releasably clamping the valve stem, further including means for mounting the lower spring retainer in said spring housing for reciprocable movement from a fixed lower position, and further characterized in that said lower spring retainer is releasably mounted in the lower end portion of the spring housing by means engageable with the inner wall of the spring housing so that the spring housing and the spring means can be removed as a unit from the fluid passage housing.

10. A pressure regulator as in claim 9, further characterized in that the means for detachably mounting the valve stem on the diaphragm comprise a bushing slidingly received in the lower spring retainer, a disc disposed beneath the bushing and engaging the upper surface of the diaphragm to limit its flexing to an outer annular portion.

11. A pressure regulator as in claim 10, further characterized in that the valve stem has a flange underlying the diaphragm, the bushing and the disc are telescoped over the upper end portion of the valve stem and a nut is threaded thereon to clamp the diaphragm against the stem flange.

12. A pressure regulator as in claim 11, further characterized in that the valve stem has, on the portion above the diaphragm, a threaded portion and a torquing section disposed above the threaded portion, and the nut is threaded onto the threaded portion, said torquing section facilitating tightening of said nut.

13. A pressure regulator as in claim 12, further characterized by said valve means comprising a valve stem projecting downwardly from said diaphragm, through said orifice, and having a plug disposed in said passage inlet portion, said valve stem also having an upper portion projecting through a central opening in said diaphragm, and further characterized in that the central opening comprises means for releasably gripping the upper end of the valve stem when it is inserted therethrough, to thereby facilitate mounting of the valve stem on the diaphragm.

14. A pressure regulator as in claim 9, further characterized in that the spring means further comprise means for adjustably compressing said spring against the lower spring retainer to provide a desired resistance to upward movement of the valve stem, said spring housing and spring, when removed as a unit, being characterized by the adjustment of the spring being unaffected by removal.

15. A pressure regulator as in claim 14, further characterized in that the spring means also includes an upper spring retainer, overlying said spring, and the means for adjustably compressing said spring comprises an adjusting screw threaded through an upper end of the spring housing and engaging the upper spring retainer, and further characterized in that the adjusting screw may be threaded to a position in which the upper spring retainer is spaced above the lower spring retainer a distance at least equal to the free height of said spring, thereby facilitating releasably mounting the lower spring retainer on said spring housing.

16. A pressure regulator as in claim 9, further characterized in that the means for mounting the lower spring retainer within the spring housing comprises bayonet means including angular spaced lugs, respectively, on the lower spring retainer and the spring housing, which may be axially telescoped and then rotated into aligned relation to limit axial movement of the lower spring retainer downwardly of the spring housing, thereby facilitating assembly and disassembly of the spring and lower spring retainer in and from the spring housing.

17. A pressure regulator as in claim 9, wherein the valve means comprises a plug on the distal end of the stem, said stem extending through said orifice and said plug being disposed in said inlet passage portion, beneath the orifice, said valve means being displaced upwardly toward a position in which said plug closes said orifice in response to an increase in pressure in said sensing chamber, further characterized by selectively actuable means for preventing movement of the spring retainer upwardly from said fixed lower position to a position wherein the valve closes the orifice, whereby the conduit passageway can be pressurized to a high pressure level in cleaning the valve.

18. A pressure regulator as in claim 9, further characterized in that the lower spring retainer positions the upper end of the valve stem, the spring housing has a bore which receives and positions the lower spring retainer relative thereto, and the spring housing and fluid passage housing have coacting surfaces which position the housings relative to each other, said lower spring retainer being positioned relative to the valve stem, and said lower spring retainer being positioned relative to the spring housing and said housings being positioned with respect to each other so that the valve stem is disposed coaxially of said orifice.

19. A pressure regulator as in claim 9 further characterized by releasable means for mounting the valve stem in fixed axial relation on said lower spring retainer.

20. A pressure regulator as in claim 19 further characterized by a disc, of relatively large diameter, disposed in engagement with the undersurface of the diaphragm, support means of substantially the same relatively large diameter disposed in engagement with the upper surface of the diaphragm, whereby flexure of the diaphragm is limited to an outer annular portion thereof.

21. A pressure regulator as in claim 19 further characterized in that the valve means stem extends through said orifice and has a plug disposed in the inlet passage portion, the pressure sensing chamber is disposed downstream of the orifice, a housing collar is disposed between the spring housing and the fluid passage housing, said lower spring retainer has portions disposed above said housing collar and engageable therewith to define the lower position of the retainer and the lower position of the valve stem, said compression spring urging said lower spring retainer and valve stem to their lower positions, which are defined by said collar.

22. A pressure regulator as in claim 19 further characterized in that the valve means stem has a plug engageable with an upper, upstream entrance to said orifice, the pressure sensing chamber in disposed upstream of the orifice, a housing collar is disposed between the spring housing and the fluid passage housing, selectively actuated means acting on said compression spring to urge said lower spring retainer and valve stem to their lower positions defined by engagement of the valve stem plug with the entrance to said orifice, said lower spring retainer has lug portions disposed above said collar, and a second compression spring disposed between said collar and said lug portions and urging the spring retainer in an upwardly direction bringing the valve stem plug to an open position, said selectively actuated means being relievable from said first named compression spring, to permit said second compression spring to bring the valve stem plug to an open position in order to drain the regulator.

23. A method of making pressure regulators including forming a fluid passage housing having, in series flow relation, an inlet portion, an orifice and an outlet portion, said method comprising the steps of turning a length a bar stock to form, in axially aligned relationship, one of said passage portions, said orifice and a pressure sensing cavity portion;

forming the other passage portion in said length of bar stock, at right angles to the other passage portion and entering into said pressure sensing cavity portion, and joining a second length of bar stock to said first length of bar stock, said second length of bar stock having a continuation of the outlet passage portion.

* * * * *